United States Patent [19]

Jalbert

[11] 4,270,714
[45] Jun. 2, 1981

[54] PARACHUTE CANOPY

[76] Inventor: Domina C. Jalbert, 170 NW. 20th St., Boca Raton, Fla. 33432

[21] Appl. No.: 93,328

[22] Filed: Nov. 13, 1979

Related U.S. Application Data

[63] Continuation of Ser. No. 903,634, May 8, 1978, abandoned, which is a continuation of Ser. No. 460,036, Apr. 11, 1974, abandoned.

[51] Int. Cl.³ .............................................. B64D 17/02
[52] U.S. Cl. ...................................... 244/145; 244/152
[58] Field of Search ................... 244/145, 142, 152, 99

[56] References Cited

U.S. PATENT DOCUMENTS

| | | | |
|---|---|---|---|
| 2,734,706 | 2/1956 | Jalbert | 244/145 |
| 3,228,636 | 1/1966 | Lemoigne | 244/145 |
| 3,298,639 | 1/1967 | Heinrich et al. | 244/145 |
| 3,385,540 | 5/1968 | Basnett | 244/152 |
| 3,508,726 | 4/1970 | Lemoigne | 244/152 |

FOREIGN PATENT DOCUMENTS 371692 10/1963 Switzerland ............................ 244/152

*Primary Examiner*—Charles E. Frankfort
*Attorney, Agent, or Firm*—Jack N. McCarthy

[57] ABSTRACT

A parachute canopy is formed of a plurality of gores with three types of gore configurations; a base gore having a multiplicity of cells; a rotational control gore having a crown cell and skirt cell; and a directional gore having a crown cell. The crown is inverted by use of a cell construction and a central cap is located at the top of the crown. This central cap is reinforced so a pilot chute can be attached thereto. A crown is also shown having triangular panels which can be opened.

12 Claims, 13 Drawing Figures

TO LOAD

PARACHUTE CANOPY

This is a continuation of application Ser. No. 903,634, filed May 8, 1978, which is a continuation of application Ser. No. 460,036, filed Apr. 11, 1974, both now abandoned.

BACKGROUND OF THE INVENTION

This invention relates to the field of parachutes and contains improvements advancing the art thereof. A prior art patent showing cell construction is U.S. Pat. No. 2,734,706 to Domina C. Jalbert.

SUMMARY OF THE INVENTION

It is a primary object of the invention to provide a parachute comprising good stability and good maneuverability.

In accordance with the invention, directional gores are provided which permit air flow from the chute and include two keels for forward directional stability.

Further, in accordance with the invention, dual control gores are provided on each side for rotational maneuvering.

An object of this invention is to provide an inverted crown to stabilize a payload.

Another object of the invention is to provide a cell structure at the skirt to aid in causing the parachute to open from the skirt upward toward the crown, reducing opening shock.

A further object of the invention is to provide a rotational control gore with an opening between said gore and the adjacent gore, said control gore overlapping the adjacent gore.

Another object of the invention is to provide control lines so that a rotational control gore can have its loose edge pulled inside the canopy, creating a reverse air flow.

A further object of this invention is to provide for high speed deployment of a parachute in which the crown is fabricated from two circular rows of spaced triangular-shaped panels which are fixed at the side adjacent the next circumferential row of panels below the crown with the other two sides being free and extending inwardly to an apex located at the center of the parachute; said panels of one circular row being offset to cover the open spaces between the panels of the other circular row. Control lines extend from the apex of each of the triangular-shaped panels through a guide to the load being carried by the parachute.

Another object of the invention is to provide for a split skirt which would provide for the release of high pressure air from the skirt to prevent an excess force being applied to any fixed panel.

Another object of the invention is to provide a ring slot or slots between circumferential rows of panels to permit an excess flow of air therethrough.

DESCRIPTION OF THE PREFERRED EMBODIMENT

Figure 1:
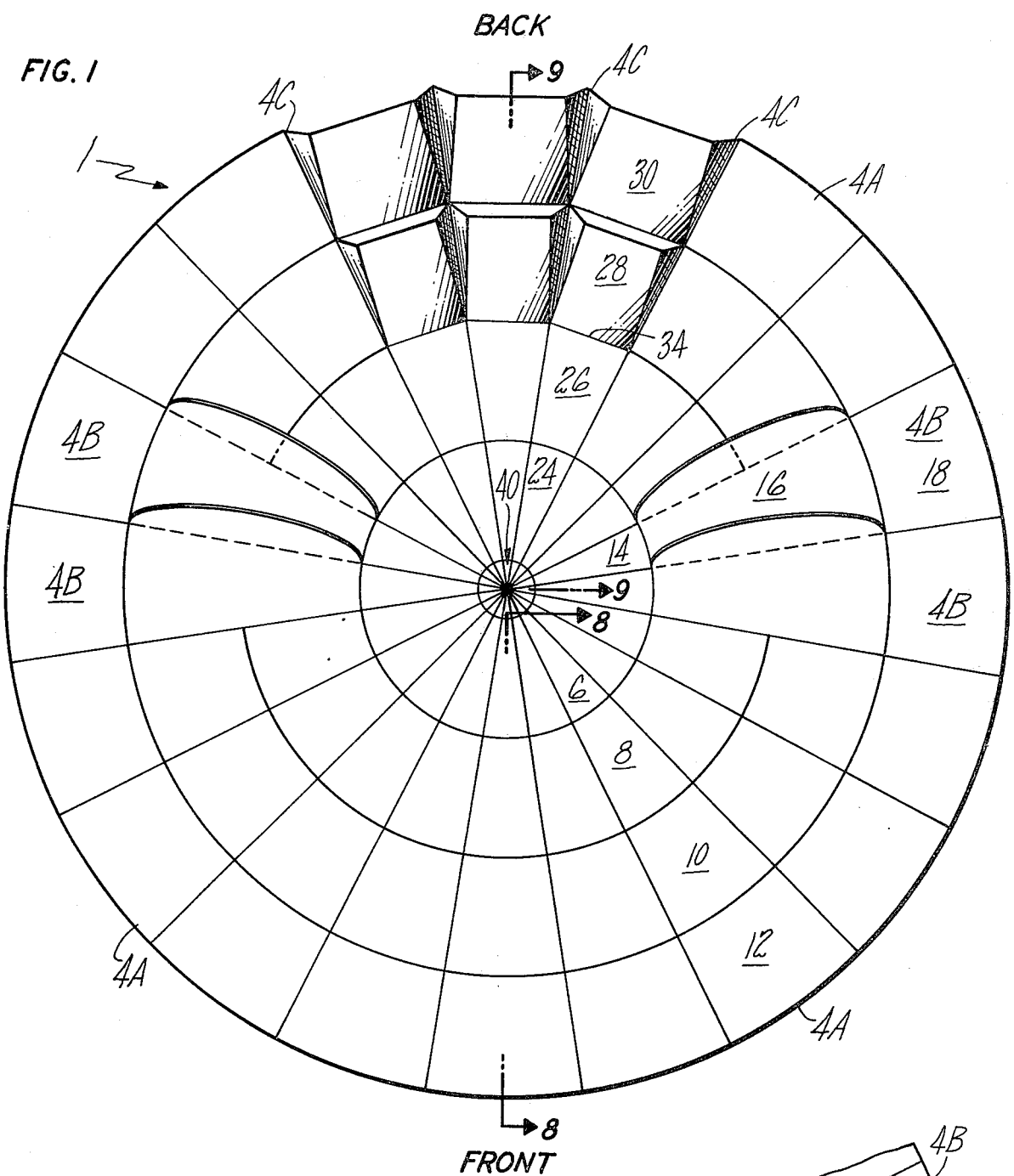
FIG. 1 is a panel chart showing the location and general construction of the panels.

As shown in FIG. 1, the panel chart shows an embodiment of the parachute canopy 1 having twenty (20) gores. Three types of gores are used: (1) a base gore 4A (2) a rotational control gore 4B having three panels; and (3) a directional gore 4C having four panels.

Figure 2:
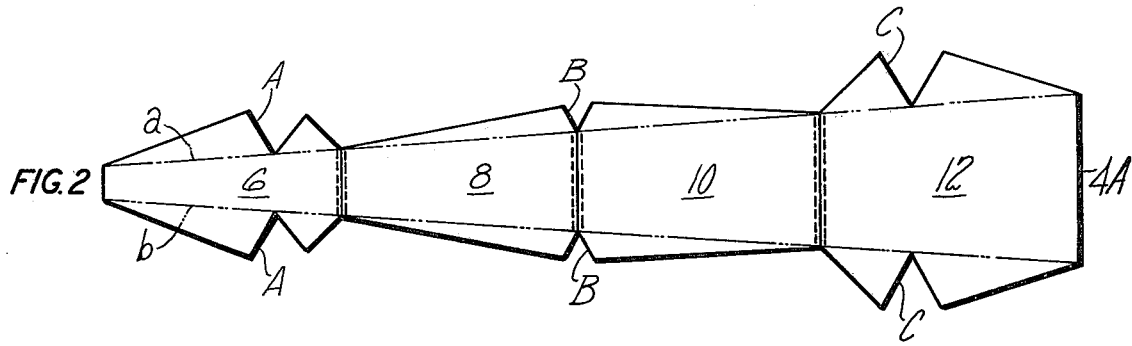
FIG. 2 is a view showing the layout of a base gore with its four panels.
Figure 8:
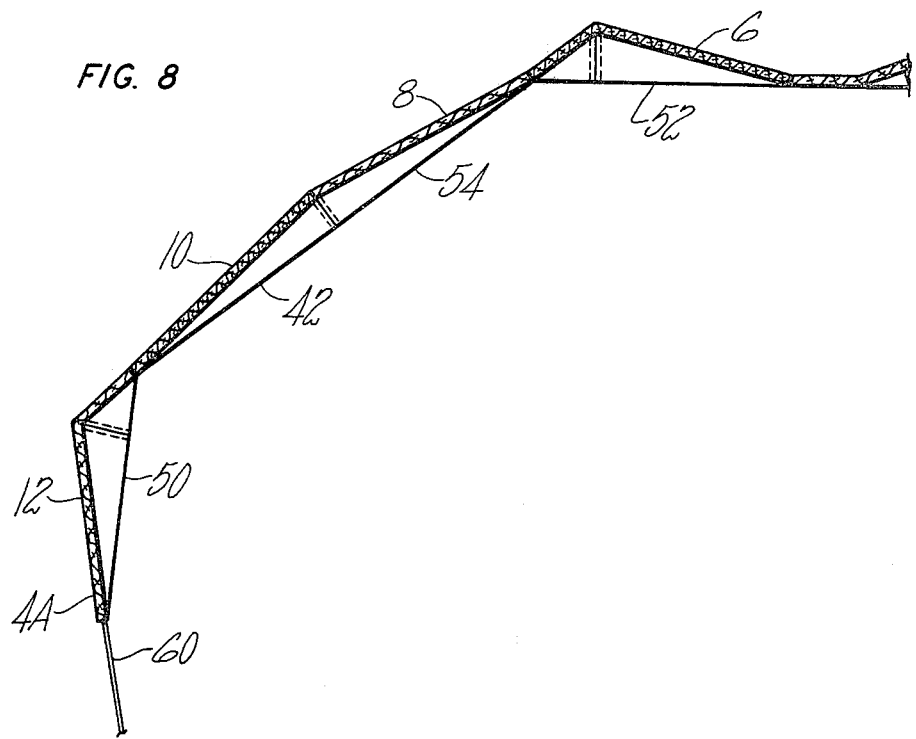
FIG. 8 is an enlarged view taken along the line 8—8 of a standard gore in FIG. 1 showing the four panels and top central cap with the panels extended to show their approximate position when inflated.
Figure 9:
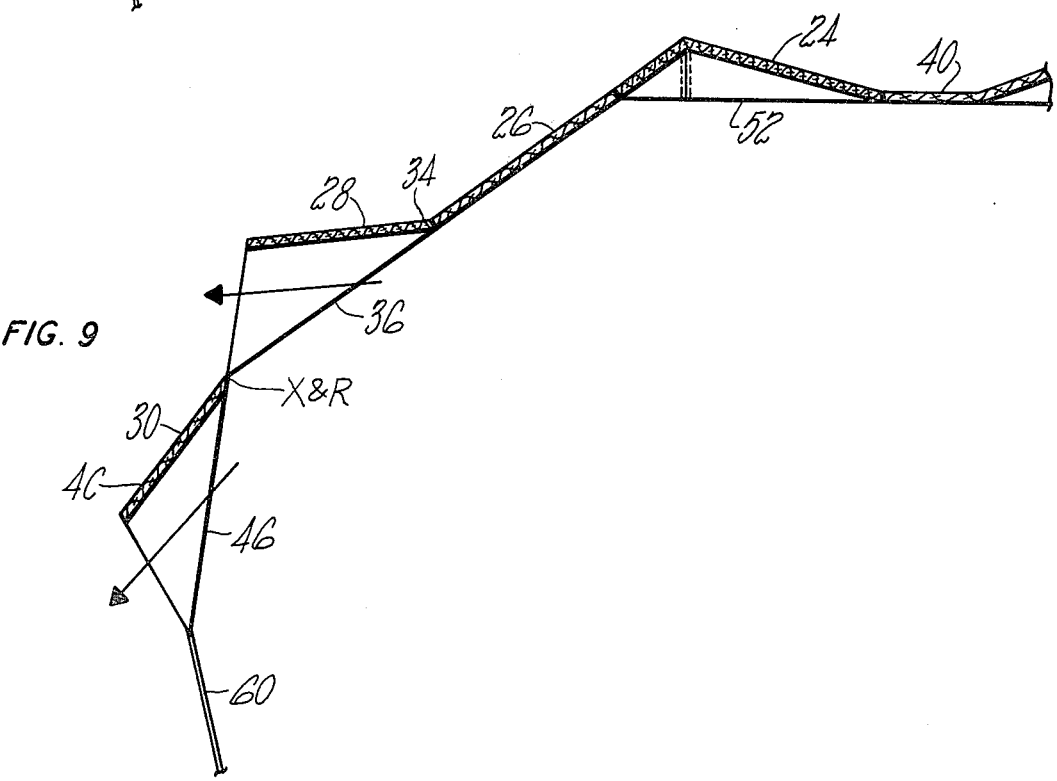
FIG. 9 is an enlarged view taken along the line 9—9 of a directional gore in FIG. 1 showing the four panels and top central cap with the panels extended to show their approximate position when inflated.

A base gore 4A comprises four panels 6, 8, 10 and 12. Panel 6 is a section of the crown and panel 12 is a section of the skirt. FIG. 2 shows the base gore with the panels sewed together but with each panel laid out flat. Gore 4A is made ready for use in the canopy by bending the material of the gore about radius lines a and b and sewing the edges of the notches A, B and C together; thus, forming built-in pockets or cells. Radius lines a and b and the size of the gores is determined by the size and shape of the parachute desired. In a parachute made, twenty (20) gores were used with each gore having a length of approximately 13'½", and an angle between radius lines a and b of approximately 16°. This forms a built-in cell within crown panel 6, a large built-in cell between panels 8 and 10, and a built-in cell within skirt panel 12. The formation of these built-in cells can be seen in FIG. 8 where the notches A, B and C are sewed together.

A right rotational control gore 4B comprises three panels 14, 16 and 18. In this construction, panel 14 is identical to panel 6 of base gore 4A, and panel 18 is identical to panel 12 of base gore 4A. Panel 16 extends for the length of both panels 8 and 10 of base gore 4A while having one side 20 cut along a radius line d and one side 22 cambered outwardly from radius line c.

Figure 3:
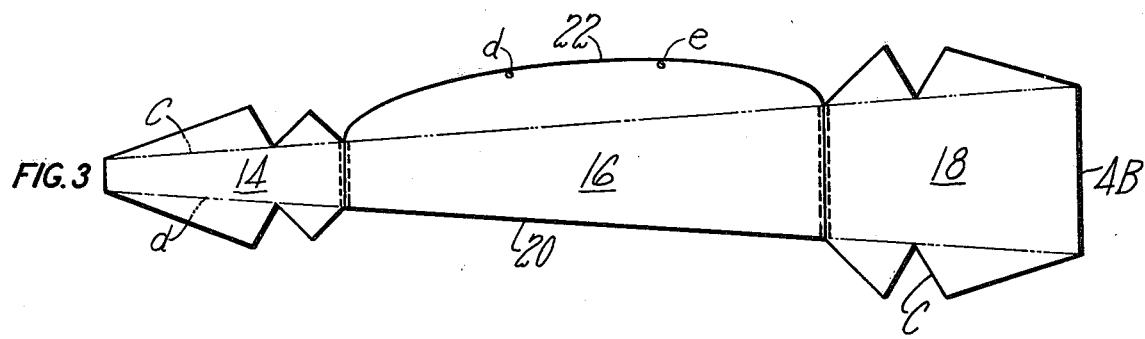
FIG. 3 is a view showing the layout of a right rotational control gore with its three panels.
Figure 4:
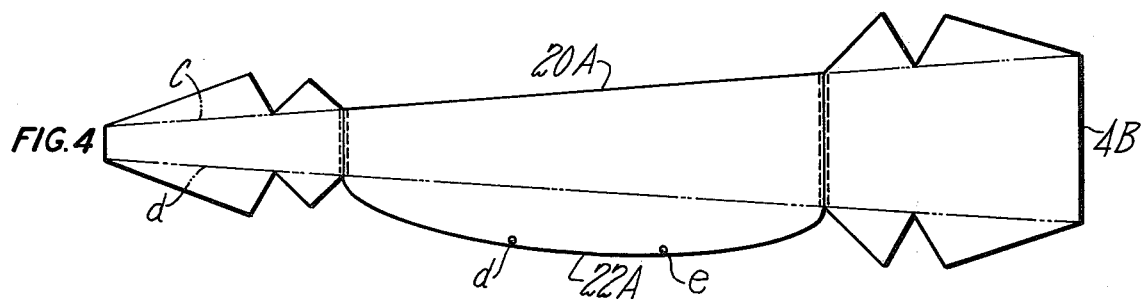
FIG. 4 is a view showing the layout of a left rotational control gore with its three panels.
Figure 5:
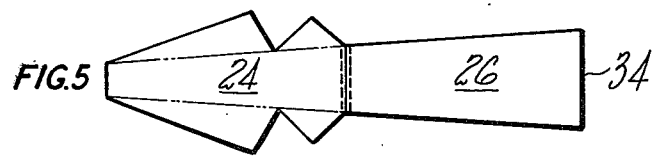
FIG. 5 is a view showing the layout of the first and second panels of a directional gore.

FIG. 3 shows this right rotational control gore with the panels sewed together, but with each panel laid out flat. Here again, the gore 4B is made ready for use in the canopy by bending the material of the gore about radius lines c and d and sewing the edges of the notches A and C together; thus, forming built-in pockets or cells. FIG. 4 shows the left rotational control gore and is formed in a manner such as the right rotational control gore, except that the sides 20A and 22A of the panel 16 are reversed.

To provide for control of the right and left rotational control gores, control lines extend upwardly into the parachute on each side with each control line having a V-section at the top permitting two points of the control line to be attached to the gore to be controlled. The ends of the V-section of shroud line are attached to the points d and e of the sides 22 and 22A of the right and left rotational control gores, respectively. It can be seen that when a control line is pulled, causing the excess overlapping material to be pulled inside the parachute, this provides a reverse air flow which will result in a circumferential rotating action on the parachute.

A directional gore 4C comprises four panels 24, 26, 28 and 30. In this construction, panel 24 is identical to panel 6 of base gore 4A and panel 14 of gore 4B, including a built-in cell. These panels 6, 14 and 24 of gores 4A, 4B and 4C form the entire crown around the central cap 40 which is located at the center of the canopy. Panel 26 is formed as a flat panel, while panels 28 and 30 are formed as lifting panels which permit air flow from the interior of the canopy. Panel 28 has its end 32 sewed to the mating end 34 of panel 26, while edges 36 and 38 are sewed to adjacent panels. Where gore 4C is adjacent to gore 4A, the edge 36 or 38 is sewed along the bottom edge 42 of panel 10, and where gores 4C are adjacent one another, one edge 36 is sewed to an adjacent edge 38. In the embodiment shown, this occurs in two instances, thereby forming two keels, or directing vanes, along the row of panels just above the skirt.

Panel 30 has its end 44 connected to the panel 28 by having its ends R and S connected to the points X and Y, respectively, which are at the ends of edges 36 and 38. Edges 46 and 48 are sewed to adjacent panels. Where gore 4C is adjacent to gore 4A, the edge 46 or 48 is sewed along the bottom edge 50 of panel 12 and where gores 4C are adjacent one another, one edge 46 is sewed to an adjacent edge 48. In the embodiment shown, this occurs in two instances, thereby forming two keels, or directing vanes, along the bottom row of panels, which is the skirt. Panels 28 and 30 can be set at various angles with respect to adjacent side panels to achieve a desired directional control. It is noted that, if desired, a directional gore 4C can include only one lifting panel.

To form a completed canopy, base gores 4A, when their panels and notches have been sewn together, are connected one to the other by having the edges 52, 54, 42 and 50 of panels 6, 8, 10 and 12 sewed together. Rotational control gores 4B, when their panels and notches have been sewn together, are connected to adjacent base gores 4A by having the edges 52 of panels 6 and 14, and edges 50 of panels 12 and 18 sewed together. Where side 20 is adjacent base gore 4A, it is sewed to edges 42 and 54 and where edge 22 is adjacent the base gore 4A, it overlaps the gore, loosely providing an opening therebetween. Where rotational gores 4B are adjacent each other, the crown panels 14 and base panels 18 are connected, just as the crown panels and skirt panels with the base gore 4A. While the connection of the panels 28 and 30 has been discussed as they form a completed canopy, the other two panels 24 and 26 of directional gore 4C have not been discussed. Panel 24 has its edges 52 sewed to the adjacent edges 52 of panels 6 of base gores 4A or other panels 24 of directional gores 4C, whichever are adjacent. Panel 26 has its edges connected to either edge 54 of a panel 8 of a base gore 4A or an adjacent edge of another panel 26 of another directional gore 4C, whichever is adjacent.

Connected to the central cap 40 are carrier lines 60 which are secured between certain of the adjacent edges of the panels and gores and depend in the usual manner from the edge of the canopy. These carrier, or shroud lines, 60, are of the conventional type and are attached in the usual manner to insure safety in canopy operation. The parachute material can be nylon and each gore has its panels connected one to the other by conventional means also in the interest of safety.

Figure 7:
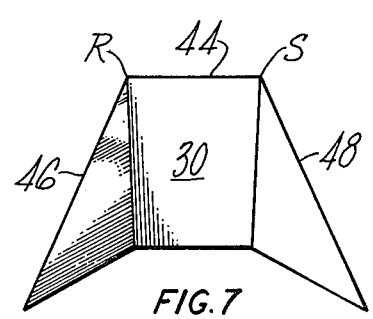
FIG. 7 is a view showing the fourth panel of a directional gore.
Figure 6:
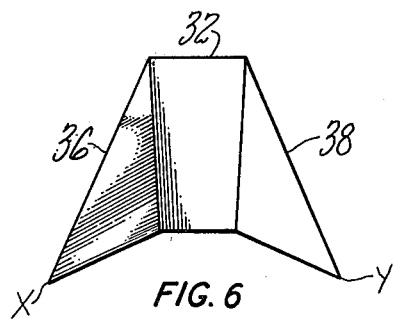
FIG. 6 is a view showing the third panel of a directional gore.

It is noted that panels 28 and 30 have their upper surfaces tapered inwardly (see FIGS. 6 and 7) as they extend rearwardly to provide a nozzle effect.

The depth of the built-in cells, or pockets, formed in crown panels 6, 14, and 24 and skirt panels 12 and 18 and formation of the side edges can be controlled in construction by use of the amount of material on the outside of the radius lines (for example, a and b) and the notches A and C. In a like manner, the cell formed by pockets 8 and 10 can be controlled in construction. The cells constructed are shown as being of an amount of material and sized notch so as to form a straight line at the edge of the cell. This is shown by edge 52 of cells formed by panels 6, 14 and 24, edge 50 of cells formed by panels 12 and 18, and edge 42, 54 of cells formed by panels 8 and 10.

In a base gore 4A, the cell formed by panels 8 and 10 has its fixed built-in maximum camber located at its center as the panels are of approximately the same length. The cell formed in panel 6 has it fixed built-in maximum camber located away from central cap 40, and the cell formed in panel 12 has its fixed built-in maximum camber located away from the lower edge of the canopy. This plurality of cells provides a multiplicity of centers-of-effort to effect a more efficient operating canopy.

Figure 10:
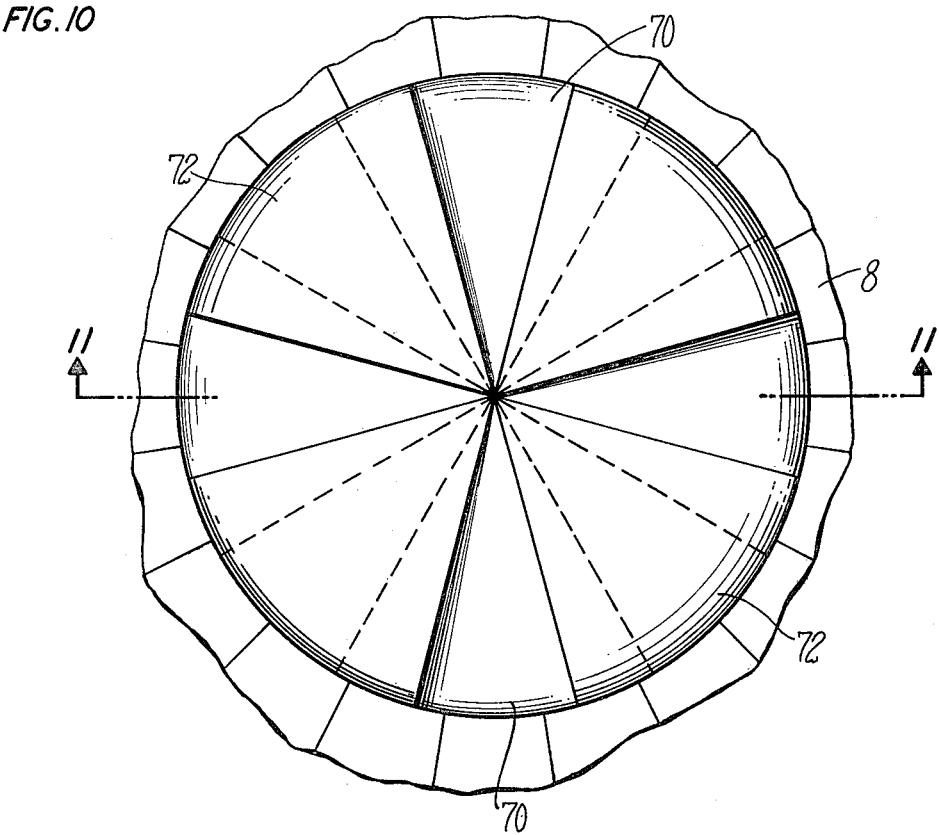
FIG. 10 is a view showing a modification of the crown.
Figure 11:
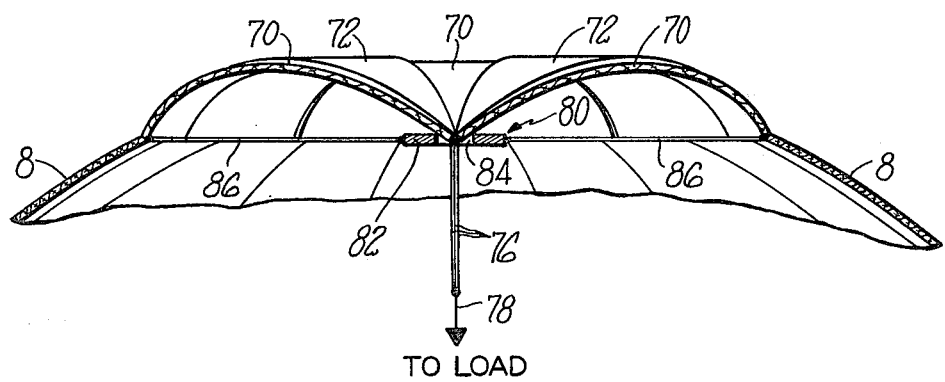
FIG. 11 is a view taken along the line 11—11 of FIG. 10 showing the triangular-shaped panels in their closed position.
Figure 12:
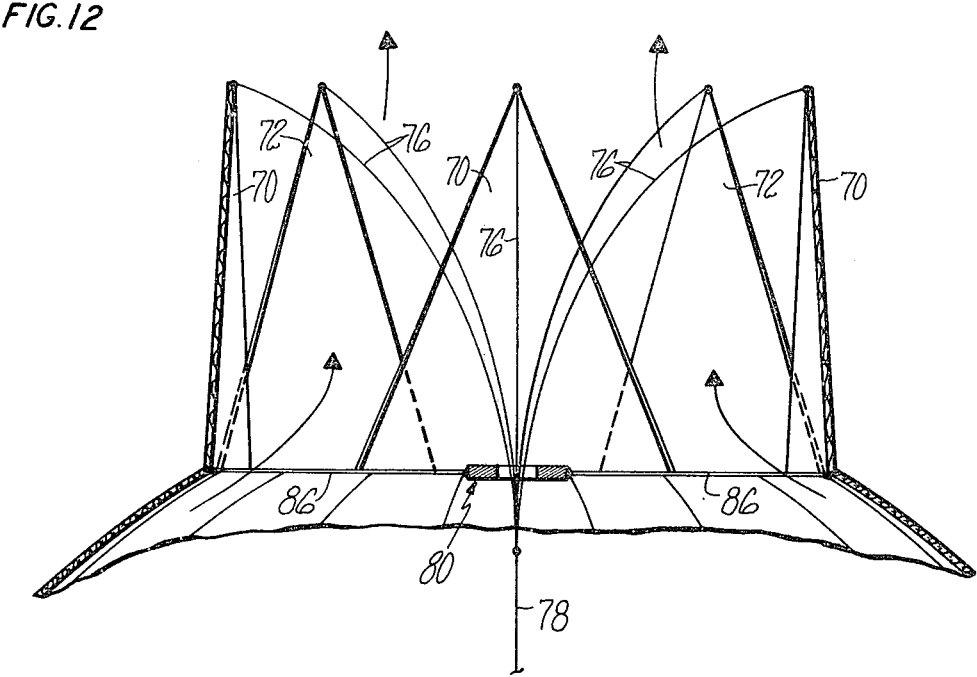
FIG. 12 is a view similar to FIG. 11 showing the triangular-shaped panels in their open position.

A modification of the crown is shown in FIGS. 10–12 and includes the use of two circular rows of spaced triangular-shaped panels 70 and 72. In this modification, one circular row of triangular-shaped panels 70 is offset from the other row of triangular-shaped panels 72 so that the triangular-shaped panels of one row covers the openings between the panels of the other circular row. The triangular-shaped panels 70 and 72 are only fixed at the side which is adjacent the next circumferential row of panels below the crown (shown as panels 8 in FIG. 11), the other two sides being free and extending inwardly to an apex located at the center of the parachute. A control line 76 is connected to each apex of the triangular-shaped panels 70 and 72 which are in turn shown connected to a single control line 78 which is connected to the load to be carried by the parachute. To provide for an equal spacing of the triangular-shaped panels 70 and 72 in their closed position, as shown in FIG. 11, a guide means 80 is used which includes a flat member 82 having an opening 84 at the center thereof. A plurality of connecting lines 86 position the guide means 80 at the center of the parachute at the top of the panels 8 which is at the base of the crown. In a construction built, four (4) lines 86 were used, spaced approximately 90° apart. The control line 78 and control line 76 extend down through opening 84 with the line 78, as mentioned hereinbefore, being connected to the load being carried by the parachute.

In the modification shown, four (4) triangular-shaped panels are used in each circular row; however, any desired number can be used depending on size and use of the parachute.

FIG. 12 shows the action of the triangular-shaped panels when contacted by extreme pressure during high speed deployment; the panels 70 and 72 are blown outwardly to prevent excessive pressures from building up in the parachute and when normal descension conditions have been reached, the weight of the load will pull each apex down to the opening 84 to a position such as shown in FIGS. 10 and 11, thereby closing the crown.

In a control modification of the crown construction shown in FIGS. 10–12, the apex of each of the triangular-shaped panels 70 of one circular row is connected by one set of control lines 76, while the apex of each of the triangular-shaped panels 72 of the other circular row is connected by another set of control lines 76. One group of control lines 76 is connected to a first single control line 78 while the other set of lines 76 is connected to a second single control line 78. It can be seen that the triangular-shaped panels 72 can be raised by use of the first control line 78 to have a separate control for air flow through spaces between the triangular-shaped panels 70 of the crown. A method of operation could be in allowing the panels 72 and 70 to operate separately for desired opening control, with the triangular-shaped panels 72 being opened first, and then the triangular-shaped panels 70 if faster descent is desired. The use of the two control lines 78 can be tied in with an automatic control or operated by a manual control.

It is noted that the skirt can be split between panels to provide for a release of high pressure air within the skirt to also prevent an excess force being applied to a fixed panel in that area. Circumferential slots can also be provided between circumferential rows of regular panels between the crown and skirt to permit an excess flow of air therethrough.

Figure 13:
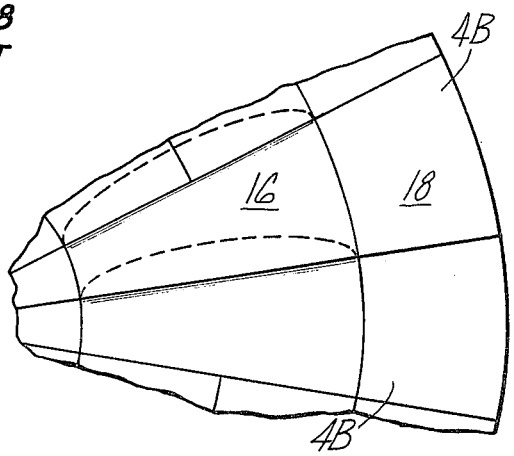
FIG. 13 is a fragmentary view of the left rotational gore shown in FIG. 1 wherein the flaps are pulled inside the parachute.

FIG. 13 shows the excess overlapping material of the left rotational gores pulled inside the parachute by control lines which extend to points d and e.

The panel chart of FIG. 1 is one basic showing of a parachute involving the invention and any size canopy can be manufactured from different combinations of the gores shown. Each different type gore can have as few or as many panels per gore as required depending on the size of the canopy. For example, a 48 ft. diameter canopy would have numerous cells like the skirt and a number like the middle cells to form a gore, while a 75 or 100 ft. canopy would still have a larger number of a combination of panels like those shown on the 20 gore canopy of FIG. 1.

I claim:

1. A parachute canopy with a skirt and crown having a plurality of circumferential rows of panels, said skirt comprising a circumferential row of panels in which a plurality of the panels form a cell, said crown comprising two circular rows of spaced triangular panels, said spaced triangular panels being offset one from the other so that the panels from one circular row cross the space between panels in the other row, said spaced triangular panels only being fixed where they engage the adjacent circumferential row below the crown, the apex of each spaced triangular panel having a control line attached thereto, a control line guide means positioned at the center of the parachute canopy and being attached to a circumferential row below the crown, said control lines passing through said guide means, said control lines being adapted to be connected to a load.

2. A parachute canopy as set forth in claim 1 wherein a plurality of panels in said skirt are formed as a nozzle to have a more directional flow from said parachute.

3. A parachute canopy as set forth in claim 1 wherein the apex of the spaced triangular panels of one circular row has one control line attached thereto and the apex of the spaced triangular panels of the other circular row has a second control line attached thereto, means for controlling each circular row of triangular panels separately.

4. A parachute canopy with a skirt and crown having a plurality of gores; said gores having three types of construction, a first gore having a plurality of panels along its length from the skirt to the crown, a second gore on each side of the parachute canopy having a space at its rearward edge with respect to its adjacent gore to achieve rotational control, and a third gore having an opening means directed rearwardly to direct air from said parachute canopy to achieve directional stability; each gore having an identical top panel for forming the crown, each top panel including a built-in pocket to provide a built-in crown without the use of central shroud lines, each built-in pocket having a length extending along the length of the gore, each built-in pocket having a fixed built-in location of maximum camber along its length, each built-in pocket having its fixed built-in location of maximum camber located at a point outwardly from the center of its length and in a direction toward the skirt, said built-in crown being built-in inverted with each built-in pocket having its fixed built-in location of maximum camber located above the center of the crown.

5. A parachute canopy as set forth in claim 4 wherein the first and second gores have an identical bottom panel forming the skirt, each bottom panel including a second built-in pocket to aid the parachute in opening from the skirt toward the crown, each second built-in pocket having a length extending along the length of the gore, each second built-in pocket having a fixed built-in location of maximum camber along its length, each second built-in pocket having its fixed built-in location of maximum camber located in a direction away from the center of its length in a direction toward the crown.

6. A parachute canopy as set forth in claim 4 wherein said first gore has two panels positioned between the skirt and crown, said two panels cooperating to form a large built-in pocket having a point of fixed maximum camber built-in where the two panels meet.

7. A parachute canopy as set forth in claim 4 wherein a central cap is located at the center of the crown at the upper ends of all of the identical top panels.

8. A parachute canopy with a skirt and crown having a plurality of gores; said gores having three types of construction, a first gore having a plurality of cells from the skirt to the crown, a second gore on each side of the parachute canopy having a space at its rearward edge with respect to its adjacent gore to achieve rotational control, and a third gore having an opening means directed rearwardly to direct air from said parachute canopy to achieve directional stability; each gore having an identical top panel forming the crown, each top panel being formed as a cell to provide a built-in inverted crown without the use of central shroud lines, each cell having a length, each cell having a fixed location of maximum camber along its length, each cell having its fixed location of maximum camber located in a direction away from the center of its length and in a direction away from the center of the crown, said opening means in said third gore is formed as a nozzle, said nozzle having a flat panel set at a predetermined angle, adjacent flat side panels connect the flat panel to adjacent gores on each side.

9. A parachute canopy as set forth in claim 8 having two adjacent third gores, said two adjacent gores having their adjacent side panels forming a directional vane.

10. A parachute canopy with a skirt and crown having a plurality of gores, a plurality of said gores having an identical top panel forming the crown, each top panel comprising a built-in pocket to provide a built-in crown without the use of central shroud lines, each built-in pocket having a length, each built-in pocket having a fixed built-in location of maximum camber along its length, each built-in pocket having its fixed built-in location of maximum camber located at a point outwardly from the center of its length in a direction toward the skirt, said built-in crown being built-in inverted with each built-in pocket having its fixed built-in location of maximum camber located above the center of the crown.

11. A parachute canopy as set forth in claim 10 wherein a plurality of said gores have an identical bottom panel forming the skirt, each bottom panel including a second built-in pocket to aid the parachute in opening from the skirt toward the crown, each second built-in pocket having a length, each second built-in pocket having a fixed built-in location of maximum camber along its length, each second built-in pocket having its fixed built-in location of maximum camber located in a direction away from the center of its length in a direction toward the crown.

12. A parachute canopy with a skirt and crown having a plurality of gores, a plurality of said gores having an identical top panel for forming the crown, each top panel including a built-in pocket to provide a built-in crown without the use of central shroud lines, each built-in pocket having a length extending along the length of the gore, each built-in pocket having a fixed built-in location of maximum depth along its length, each built-in pocket having its fixed built-in location of maximum depth located in a direction away from the center of its length and in a direction toward the skirt, each built-in pocket having built-in bottom portions, one bottom portion extending from one end of said top panel to the fixed built-in location of maximum depth, the other bottom portion extending from the other end of said top panel to the fixed built-in location of maximum depth, said built-in crown being built-in inverted with each built-in pocket having its fixed built-in location of maximum depth located above the center of the crown.

* * * * *